United States Patent [19]

Margen

[11] 4,182,403
[45] Jan. 8, 1980

[54] ARRANGEMENT FOR TRANSFERRING HEAT FROM THE EXHAUST AIR LEAVING AN ENCLOSED VOLUME TO THE INPUT AIR SUPPLIED TO SAID VOLUME

[75] Inventor: Peter H. E. Margen, Nyköping, Sweden

[73] Assignee: Aktiebolaget Atomenergi, Stockholm, Sweden

[21] Appl. No.: 924,680

[22] Filed: Jul. 14, 1978

Related U.S. Application Data

[62] Division of Ser. No. 752,992, Dec. 21, 1976, Pat. No. 4,119,142.

[30] Foreign Application Priority Data

Dec. 22, 1975 [SE] Sweden ............................. 7514560

[51] Int. Cl.$^2$ ............................................. F28D 15/00
[52] U.S. Cl. ........................................ 165/12; 165/17; 165/DIG. 12; 165/107

[58] Field of Search ............... 165/107, 12, 17, 13, 165/39, DIG. 12; 62/155, 156, 282, 82

[56] References Cited

U.S. PATENT DOCUMENTS

| 3,732,703 | 5/1973 | Nordstrom et al. | 62/278 X |
| 3,968,833 | 7/1976 | Strindehag et al. | 165/107 X |
| 3,980,129 | 9/1976 | Bergdahl | 165/DIG. 12 |
| 4,061,186 | 12/1977 | Ljung | 165/107 X |

*Primary Examiner*—Albert W. Davis, Jr.
*Attorney, Agent, or Firm*—Burns, Doane, Swecker & Mathis

[57] ABSTRACT

There is provided a heat exchanger system for transfer of heat in the warm exhaust air from a mine to the cold input air flow to the mine. In the system there is provided a heat supply means, which supplies heat, recovered from the exhaust air, to the input air heat exchanger when an exhaust air heat exchanger is disconnected for defrosting.

12 Claims, 5 Drawing Figures

ARRANGEMENT FOR TRANSFERRING HEAT FROM THE EXHAUST AIR LEAVING AN ENCLOSED VOLUME TO THE INPUT AIR SUPPLIED TO SAID VOLUME

This is a division, of application Ser. No. 752,992, filed Dec. 21, 1976 now U.S. Pat. No. 4,119,142.

The present invention relates to an arrangement for the transfer of heat from the exhaust air leaving an enclosed volume, such as a mine or the like, to the input air to said volume, comprising a liquid-filled circuit with at least one first circulation pump at least one first heat exchanger arranged in contact with the input airflow and at least one second heat exchanger arranged in contact with the exhaust airflow.

There is an advantage to be gained by recovering the heat contained in the exhaust air leaving dwelling houses, industrial premises, mines etcetera. One known method of achieving this objective to a certain extent, is to arrange a heat-exchanger in the exhaust air duct or line, which cools the exhaust air and consequently absorbs part of its heat content, and to arrange a heat exchanger in the air input duct or line, in order to heat up the input air. The two heat exchangers are coupled together through a circuit containing a circulation pump. As heat transfer medium in the circuit, it is possible to use a liquid such as a water-glycol mixture so that the heat transfer medium is prevented from freezing in the heat exchangers in the situation where the air temperatures are extremely low.

One problem occurring with this kind of known arrangement is that it is not possible to cool the exhaust air to too great an extent without the liquid content which is always present in the warm exhaust air, condensing on the surface of the heat exchanger which cools this air, so that it forms frost or ice on the heat exchanger if the exit temperature of the exhaust air becomes low. Frost formation or icing on the surface of the exhaust air heat exchanger impedes heat transfer and also increases the resistance in the exhaust air duct. This icing or frost formation can ultimately lead to blockage of the exhaust air duct. This phenomenon imposes a limit on the extent to which the exhaust air can be cooled and therefore upon how much heat can be recovered.

In a particular example, the exhaust air from a mine is at a temperature of about 7° C. As soon as the exhaust air is cooled down to the neighborhood of 0° C. by the exhaust air heat exchanger, frost and ice begin to form on the heat exchanger surface. If the input air to the mine has a temperature of for example −25° C., this is something which can happen in Northern Sweden, then only about 25% of the total heat energy supplied to the input air can be recovered if severe frost formation and icing on the exhaust air heat exchanger is to be avoided. It is an objective or major importance from the economic and fuel policy points of view to develop arrangements which will increase the fraction of recoverable heat energy without any risk of malfunctioning in the arrangement due to icing or frost formation.

The arrangement in accordance with the invention fulfills this objective and the novel features of the invention, over the preamblewise indicated known technique resides essentially in that at least one by-pass line is arranged in the liquid circuit in parallel with the second heat exchanger; in that means are arranged to control the liquid flow through the second heat exchanger whilst the latter is defrosting; and in that means are arranged to supply heat to the first heat exchanger in the form of heat extracted from the exhaust air, whilst the second heat exchanger is defrosting. The arrangement in accordance with the invention, as well as an embodiment thereof, will be defined in greater detail in the accompanying claims.

The invention will be described in more detail hereinafter making reference to the attached drawings in which FIG. 1 illustrates a first embodiment of the invention and FIG. 2 a second embodiment thereof.

Figure 1:
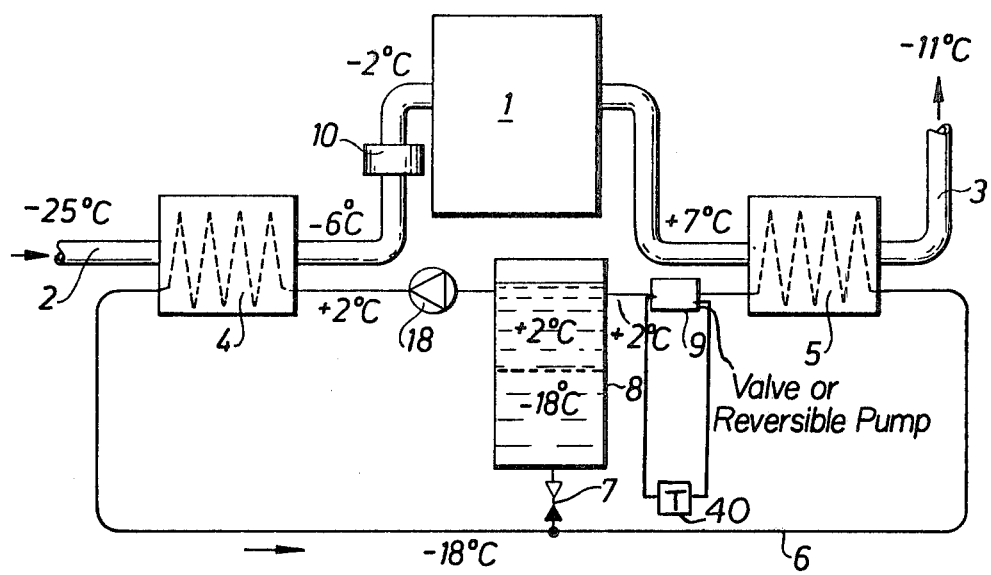

FIG. 1 schematically illustrates an enclosed volume 1 such as a mine or the like, with an air supply duct 2 and an exhaust air duct 3. Fans are normally provided, although not illustrated here, in order to circulate the air through the volume 1. A first heat exchanger 4 is arranged in the air supply duct 2. A second heat exchanger 5 is arranged in the exhaust air duct 3. The heat exchangers 4 and 5 are connected into a closed, liquid-filled circuit 6. The liquid can consist of a water-glycol mixture. A by-pass line is arranged across the second heat exchanger 5. A heat store 8 of layer design is connected into the circuit 6 and its cold side connected to the by-pass line 7. The circuit 6 exhibits a circulation pump 18 which maintains circulation of the liquid through at least the first heat exchanger 4. The circuit 6, between the heat store 8 and the second heat exchanger 5, contains an element 9. The element 9 can be constituted by a shut-off valve or a reversible circulation pump.

In operation of the installation shown in FIG. 1, with the temperature relationships set out for example in the drawing, after a relatively short period of time icing and frost formation occur at the second heat exchanger 5. As icing gradually begins to restrict heat exchange between the exhaust air and the liquid in the circuit 6, the valve 9 can be closed down. The amount of ice present can be measured by detector 30 which can operate valve or pump 9 through conventional means. This means that the exhaust air, having for example a temperature of 7° C., brings about defrosting of the second heat exchanger whilst the heat supply to the heat exchanger 4 is maintained by means of the layer of hot liquid collected in the heat store 8. During the period of operation in which defrosting is not in process, it is arranged, in other words, that only part of the liquid heated up in the second heat exchanger 5 is relayed to the first heat exchanger 4, whilst the remaining fraction of the liquid heated up in the second heat exchanger 5 is stored in the heat store to be used during a period of time during which the valve 9 is kept closed.

In a situation where the element 9 is constituted by a reversible circulation pump, the arrangement is such that the pump 9 normally pumps liquid from the second heat exchanger 5 to the heat store 8. When the second heat exchanger 5 is to be defrosted, the pump 9 is reversed so that it pumps hot liquid from the heat store 8 through the heat exchanger 5. In this case, thus hot liquid from the heat store 8 is pumped both through the heat exchanger 4 and through that 5. In this fashion, frost and ice having formed on the heat exchanger 5 are thawed both from the outside, by the warm exhaust air, and from the inside by the hot liquid from the heat store.

An external heat source 10, such as an oil-burner unit, can be arranged to reheat the input air preheated in the heat exchanger 4, in order to ensure that the air arriving in the enclosed volume 1 does not have an undesirably low temperature. In this context, account must also be taken of the situation in the exhaust air duct since the exhaust air leaving the volume 1 should have a temperature normally exceeding 0° C. so that the heat exchanger 5 can also be defrosted by the supply of heat from outside, that is to say that the relatively warm exhaust air can throw out the frost forming on the plastic tube heat exchanger 5.

Figure 2:
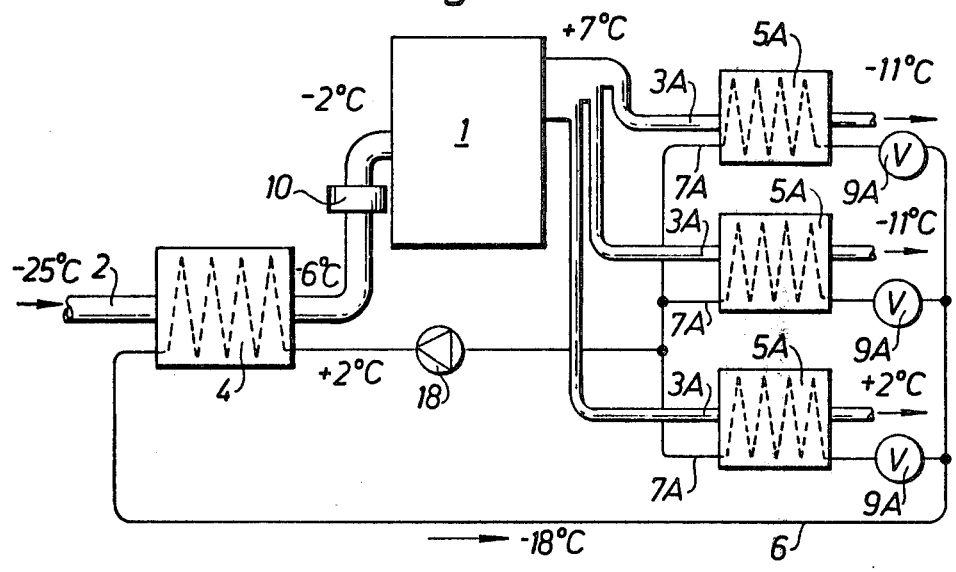

FIG. 2 illustrates a variant embodiment of the arrangement shown in FIG. 1, elements in FIGS. 1 and 2, which are identical to one another, being provided with the same reference numerals. In the arrangement shown in FIG. 2, the exhaust air from the volume 1 is taken out through three separate exhaust air ducts 3a. An exhaust air heat exchanger 5a is arranged in contact with each of the separate exhaust air flows 3a. The heat exchangers 5a are each connected into a line 7a. The lines 7a are connected in parallel and the group of lines 7a is connected in series with the circuit 6. A shut-off valve 9a is arranged in each (by-pass) line 7a.

When a certain level of frost formation or icing occurs on any of the heat exchangers 5a, its corresponding shut-off valve 9a is closed so that the flow through this particular heat exchanger is halted whilst the flow through the other heat exchanger 5a is maintained. In this way, the heat exchanger 4 is supplied with heat for the pre-heating of the input air, whilst the exhaust air thaws away ice and frost deposits on the shut-down heat exchanger 5a.

The valves 9a can be coupled to and controlled by a timer 40 which ensures that the valves 9a are shut down in turn for a predetermined and equal length of time, in a cyclic way. The length of the shut-down time can be determined on the bases of experience gained during operation of the installation. Valve or pump 9 in FIG. 1 can also be operated by such a cyclical timer. Alternatively, in the same way as with the arrangement of FIG. 1, the exhaust air pressure drop across each exhaust air heat exchanger 5a can be detected and on the basis of the figure obtained (this representing a measure of frost formation and ice) shut-down of the corresponding valve 9a can be initiated in order to bring about defrosting of the corresponding heat exchanger 5a. Equally, the length of the defrosting period can be determined for example using a temperature-sensitive element which detects the temperature at the heat exchanger surface and arranges for the valve 9a to open when the temperature drops below 0° C. Alternatively, it can be arranged for the valve 9 to open when the pressure drop of the exhaust air across the associated heat exchanger 5a, undershoots a predetermined value.

Where the number of exhaust air heat exchangers 5a is relatively small, it may be a good idea to arrange for defrosting of these heat exchangers 5a to take place cyclically. However, if there is a large number of exhaust air heat exchangers 5a, then the risk of all the exchangers 5a happening to be shut down for defrosting, should be extremely small and in this case individual defrosting may be a favourable and effective way of dealing with the problem because in this case there is a relatively large number of heat exchangers 5a.

Figure 3:
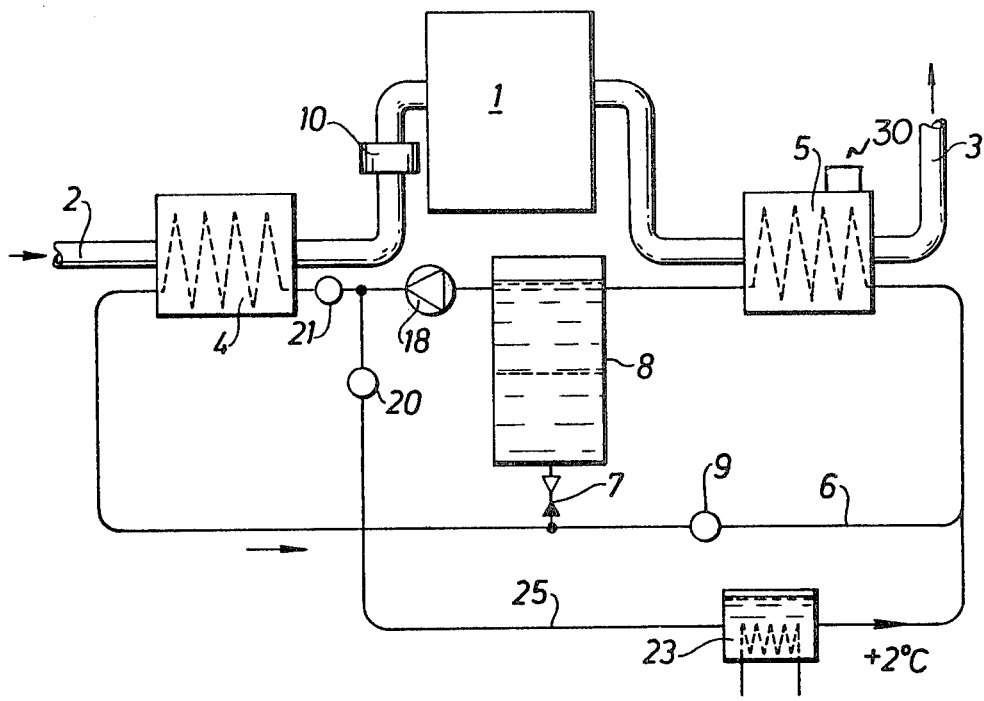
FIGS. 3 and 4 illustrate two embodiments of the invention in which an auxiliary heat source is provided in order to facilitate the defrosting.

Referring now to FIG. 3, there can be seen an arrangement corresponding to that of FIG. 1. In addition, however, in this case a second by-pass line 25 has been provided which is so arranged that it shunts the flow through the circuit 6, from a point between the circulation pump 18 and the first heat exchanger 4, to a point between the first by-pass line 7 and the second heat exchanger 5. The by-pass line 25 contains an auxiliary heat source 23 which may for example be designed as an immersion heater. In order to control the flow distribution between the circuit 6 and the by-pass line 25, a first valve 20 is arranged in the line 25 and a second valve 21 at the heat exchanger 4. The valves 20 and 21 are adjusted in such fashion that a certain flow of hot liquid from the heat store 8 through the heat exchanger 4 is maintained even when the heat exchanger 5 is being defrosted.

The immersion heater 23 heats up the liquid flow in the by-pass line 25 to a level corresponding to the temperature reduction occurring in the flow through the heat exchanger 5 whilst the latter is being defrosted, with the result that the flow leaving the heat exchanger 5 and arriving in the heat store 8 has a temperature which does not differ too radically from the temperature in the hot section of the heat store 8.

Figure 4:
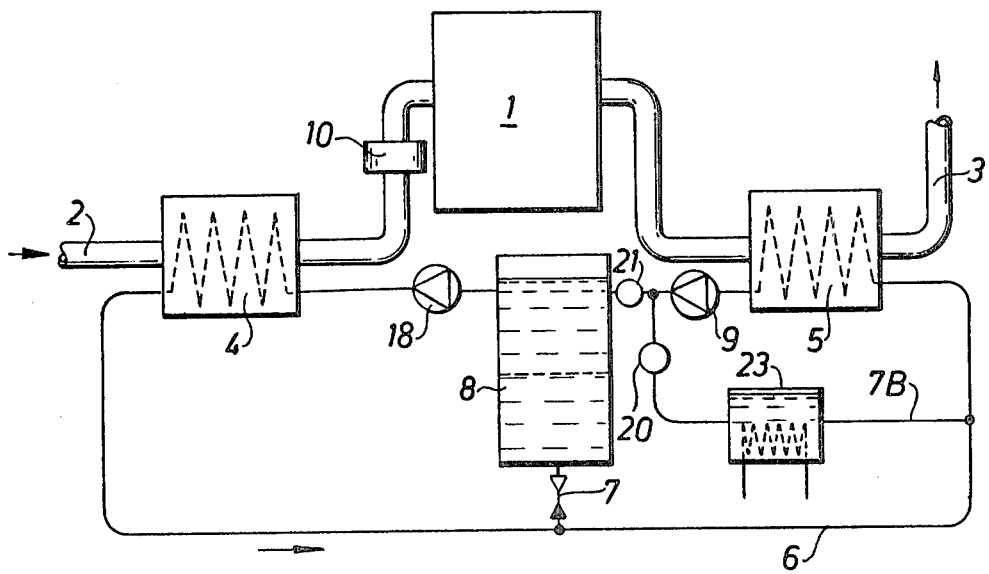

Referring now to FIG. 4, there can be seen an alternative method of coupling the auxiliary heat source 23 into the arrangement in accordance with the invention. In this instance, a by-pass line 7b has been provided, which extends from a point between the circulation pump 9 and the heat store 8, to a point between the by-pass line 7 and the second heat exchanger 5. The flow distribution between the circuit 6 and the by-pass line 7b is regulated by valves 20 and 21 which are arranged after the branch between the by-pass line 7b and the circuit 6. The valve 20, 21 can of course be designed as a three-way valve and need not leak any flow into the main circuit 6 since the by-pass valve 7 ensures that circulation through the heat store 8 and the first heat exchanger 4 is maintained for the time during which the second heat exchanger 5 is being defrosted.

Figure 5:
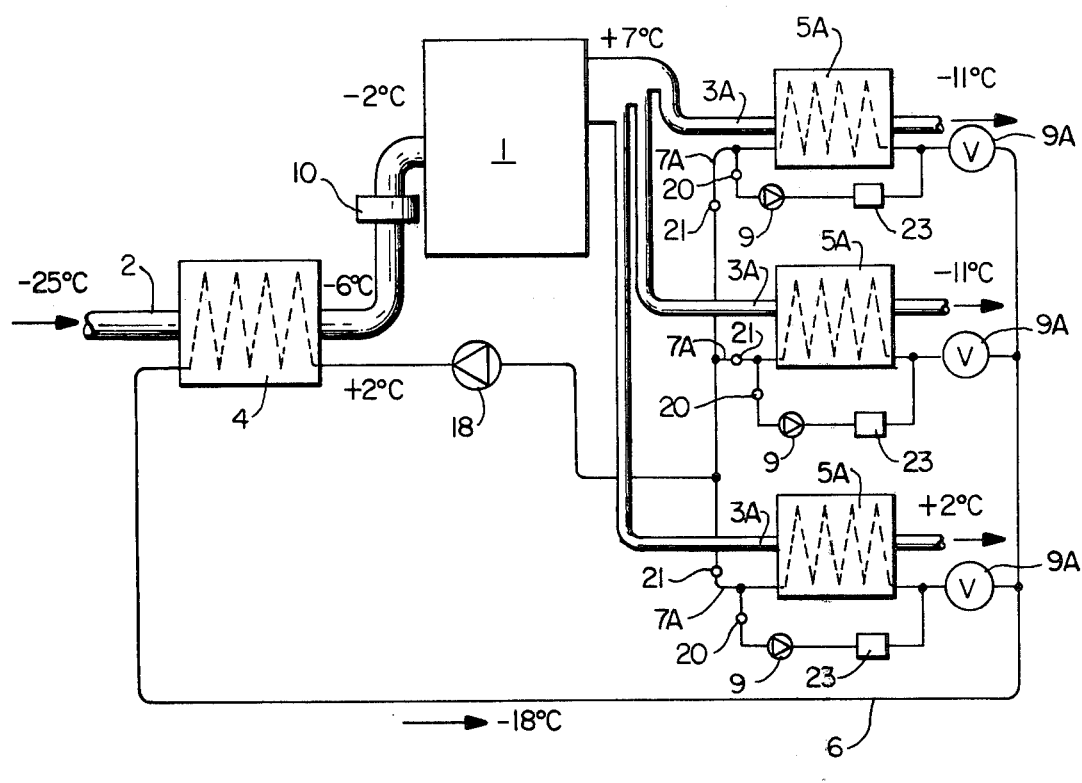
FIG. 5 illustrates the embodiment of FIG. 2 having an auxiliary heat source in accordance with the arrangement of FIG. 4.

It should be clearly understood, furthermore, that a corresponding arrangement of by-pass lines and immersion heaters can be assigned to the heat exchangers 5a of FIG. 2, as illustrated in detail in FIG. 5.

What is claimed is:

1. An arrangement for the transfer of heat from the exhaust air leaving an enclosed volume to the input air to said volume comprising a liquid filled circuit having:
   at least one first circulation pump;
   at least one first heat exchanger arranged in contact with the input air flow;
   at least one second heat exchanger arranged in contact with the exhaust air flow;
   valve means for controlling the liquid flow through said second heat exchanger;
   a plurality of by-pass lines arranged in said circuit in parallel with said second heat exchanger for supplying heat to said first heat exchanger in the form of heat extracted from said exhaust air while said second heat exchanger is disconnected from said liquid filled circuit for defrosting;
   an auxiliary second heat exchanger coupled into each of said by-pass lines; and
   a shut-off valve incorporated in each of said by-pass lines.

2. An arrangement as claimed in claim 1, characterized in that the liquid flow control means are controlled by a timer which cyclically initiates shut-down of the circuit for a certain part of the cycle.

3. An arrangement as claimed in claim 1, characterized in that the flow control means are arranged to be initiated by detecting element which detects a certain level of ice formation on the second heat exchanger, and which maintains this initiated condition as long as the ice deposit on the second heat exchanger is greater than a predetermined value.

4. An arrangement as claimed in claim 2, characterized in that the length of the said part of the cycle is controlled by the external temperature.

5. An arrangement as claimed in claim 2, characterized in that the length of the said part of the cycle is designed to be manually adjustable.

6. An arrangement as claimed in claim 3, characterized in that the detecting element detects icing by detecting the exhaust air pressure drop across the second heat exchanger.

7. An arrangement as claimed in claim 3, characterized in that the detecting element is designed to maintain the defrosting until the surface temperature of the second heat exchanger exceeds 0° C.

8. An arrangement as claimed in claim 1, characterized in that the shut-off valves are arranged in order, successively, to close off the flow through the respective second heat exchangers, so that they may be defrosted by means of the exhaust air.

9. The heat transfer arrangement of claim 8, further including a second by-pass line arranged in parallel with each of the second heat exchangers, and a pump included in each of the second by-pass lines for circulating liquid through a second heat exchanger when the associated shut-off valve is closed.

10. The heat transfer arrangement of claim 9, further including a heating source connected to each of said second by-pass lines.

11. An arrangement as claimed in claim 1, characterized in that at least one second by-pass line disposed in parallel with the second heat exchanger, comprises an auxiliary heat source arranged in order, at the time of defrosting of the second heat exchanger, to supply heat to the liquid flowing through said heat exchanger; and in that valve elements are arranged in order to direct the circuit flow to the second by-pass line.

12. An arrangement as claimed in claim 3, characterized in that the flow control means is a shut-off valve, and in that the initiation comprises shut-down of the flow control means.

* * * * *